United States Patent
Bekkedahl et al.

(10) Patent No.: US 6,913,845 B2
(45) Date of Patent: Jul. 5, 2005

(54) REDUCING FUEL CELL CATHODE POTENTIAL DURING STARTUP AND SHUTDOWN

(75) Inventors: Timothy A. Bekkedahl, Loveland, CO (US); Lawrence J. Bregoli, Southwick, MA (US); Richard D. Breault, North Kingstown, RI (US); Emily A. Dykeman, Cheyenne, WY (US); Jeremy P. Meyers, West Hartford, CT (US); Timothy W. Patterson, East Hartford, CT (US); Tommy Skiba, Hartford, CT (US); Chris Vargas, Hamden, CT (US); Deliang Yang, Houston, TX (US); Jung S. Yi, Mansfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/282,311

(22) Filed: Oct. 28, 2002

(65) Prior Publication Data

US 2004/0081866 A1 Apr. 29, 2004

(51) Int. Cl.⁷ .............................. H01M 8/24; H01M 8/10
(52) U.S. Cl. ............................................ 429/18; 429/32
(58) Field of Search ............................... 429/18, 32, 42, 429/30

(56) References Cited

U.S. PATENT DOCUMENTS

| | | | | |
|---|---|---|---|---|
| 3,622,490 A | * | 11/1971 | Lockett | 204/220 |
| 4,377,445 A | * | 3/1983 | Grimes | 205/343 |
| 5,364,711 A | * | 11/1994 | Yamada et al. | 429/15 |
| 5,824,428 A | * | 10/1998 | Nishida et al. | 429/26 |
| 5,925,477 A | * | 7/1999 | Ledjeff et al. | 429/32 |
| 5,945,232 A | * | 8/1999 | Ernst et al. | 429/32 |

* cited by examiner

Primary Examiner—Patrick Joseph Ryan
Assistant Examiner—Julian Mercado
(74) Attorney, Agent, or Firm—M. P. Williams

(57) ABSTRACT

Each cell of a fuel cell stack is provided, between the anode 37 and cathodes 38, with either (a) a permanent shunt (20) which may be a discrete resistor (42–44), a diode (95), a strip of compliant carbon cloth (65), or a small amount of conductive carbon black (22) in the ionomer polymer mixture of which the proton exchange membrane (39) is formed, or (b) a removeable shunt such as a conductor (69) which may be rotated into and out of contact with the fuel cell anodes and cathodes, or a conductor (85) which may be urged into contact by means of a shape memory alloy actuator spring (90, 91), which may be heated.

11 Claims, 4 Drawing Sheets

$O^2 + 4H^+ + 4e^- \rightarrow 2H_2O$ $C + H_2O \rightarrow CO_2 + 4H^+ + 4e^-$
$2H_2O \rightarrow O^2 + 4H^+ + 4e^-$ $H_2 \rightarrow 2H^+ + 2e^-$ $O^2 + 4H^+ + 4e^- \rightarrow 2H_2O$

EXTERNAL SHORT 20

$O^2 + 4H^+ + 4e^- \rightarrow 2H_2O$

INTERNAL ELECTRONIC SHORT 22

$O^2$ $H_2 \rightarrow 2H^+ + 2e^-$ $O^2$

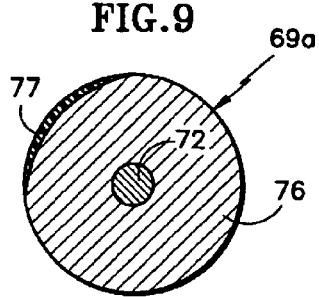
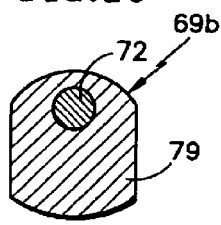
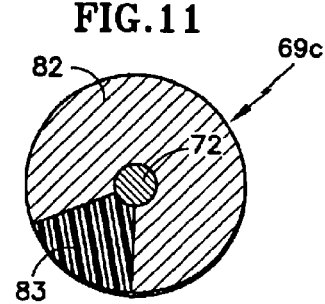
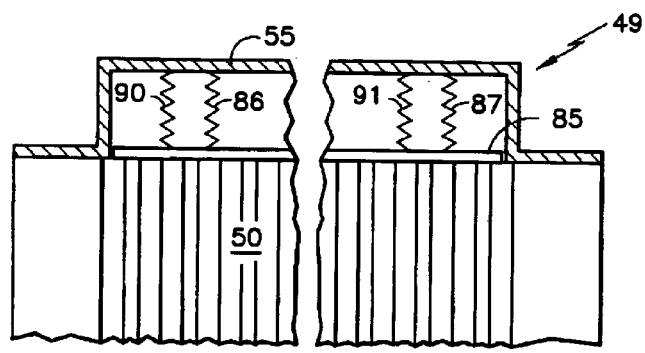
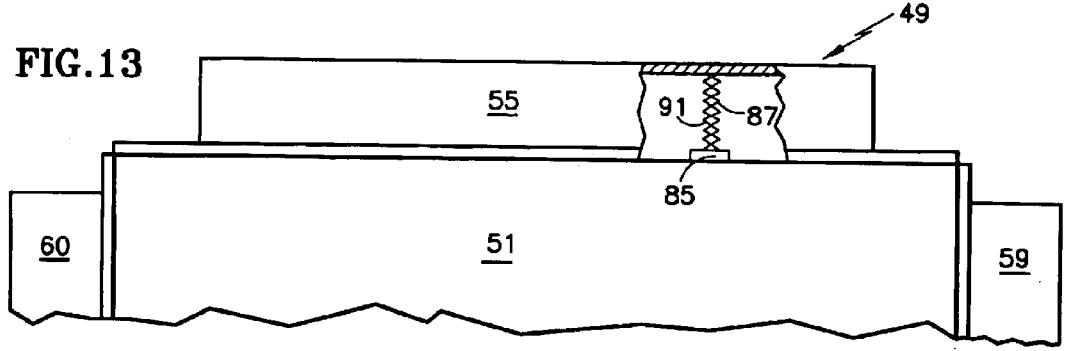
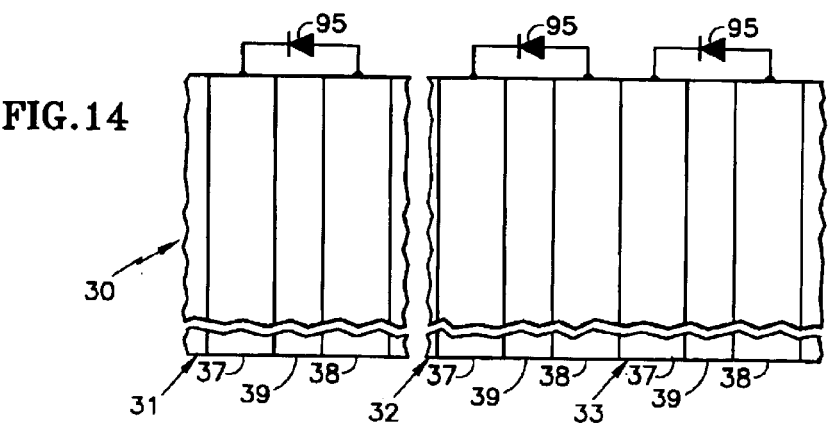

REDUCING FUEL CELL CATHODE POTENTIAL DURING STARTUP AND SHUTDOWN

TECHNICAL FIELD

This invention relates to providing an electronic short across each individual cell of a fuel cell stack to thereby prevent excessive cathode potential which otherwise occurs as a consequence of both fuel and air being present within the anode flow field in individual cells, such as during startup and shutdown.

BACKGROUND ART

It has been known that corrosion of amorphous carbon catalyst supports and metal catalyst, which occurs during startup and shutdown of polymer electrolyte membrane (PEM) fuel cells, results in a permanent decay of fuel cell performance. It has also been known that the corrosion is due to a reverse current situation in which the cathode potential may be well in excess of one volt higher than the potential of a standard hydrogen electrode. It is believed that this is caused by both hydrogen and air being present at different locations within the anode flow field. During a shutdown period, where no inert gas purge is used, air will slowly, uniformly fill both the anode and cathode flow field of the fuel cell. During startup, hydrogen is fed to the anode flow field which results in the inlet to the anode flow field being primarily hydrogen while the exit of the anode flow field is primarily air. An electrochemical reaction occurs between the fuel rich zone in the anode flow field and the oxygen rich zone in the anode flow field that causes the potential of the anode in the oxygen rich zone to increase to the air open-circuit potential. This in turn raises the potential of the cathode, opposite to the air rich zone on the anode, to a potential of 1.4–1.8 volts versus a standard hydrogen electrode. This potential causes the carbon based catalyst support to corrode and results in decreased cell performance. In automotive applications, that may experience 50,000–100,000 startup/shutdown cycles, this results in catastrophic performance loss. Heretofore, solutions to this problem include stabilizing the fuel cell stack by purging the anode flow fields with an inert gas, such as nitrogen, and maintaining an auxiliary load across the fuel cell stack during the shutdown and startup processes.

In commonly owned, copending U.S. patent application Ser. No. 09/742,481, filed Dec. 20, 2000, it is shown that as the fresh hydrogen-containing fuel flows through the anode flow field upon startup, to displace the air therein, the corrosion of the platinum catalyst and catalyst support occurs as the hydrogen/air interface moves through the anode flow field. The extent of corrosion is mitigated by rapidly purging the air with hydrogen during startup of the fuel cell. In a similar fashion, it is known that as purge air is passed through the anode upon shut-down, there is a hydrogen/oxygen interaction, which creates a potential safety hazard and may cause undesirably large voltage excursions in the cells, as described in commonly owned, copending U.S. patent application Ser. No. 09/742,497, filed Dec. 20, 2000.

DISCLOSURE OF INVENTION

Objects of the invention include: reducing catalyst and support corrosion in a fuel cell stack; reducing performance decay of PEM fuel cell stacks which result from startup and shutdown cycles; reducing the potential to which the cathode of a PEM fuel cell stack can rise during startup and shutdown; and improved fuel cell stacks.

The invention is predicated on recognition of the fact that while purging of the anode with an inert gas reduces the amount of time over which excessive cathode potentials can occur during startup and shutdown of a PEM fuel cell, the use of a purge gas cannot reduce the potentials to which the catalyst supports are subjected. The invention is further predicated on recognition of the fact that an auxiliary load imposed across the entire fuel cell stack cannot reduce the voltage in any individual cell, since other cells in the stack can assume complimentary voltages; stated alternatively, since the current through the cell stack is serial, the current in each cell is the same as that in each other cell, thereby obviating the ability to control the voltage in any one cell which is dependent on the gas composition within each cell.

According to the present invention, a shunt is provided across each individual cell of a fuel cell stack, thereby limiting the ability of each individual cell to suffer high cathode potentials. The shunt across each cell is sometimes referred to as a "short", and may be thought of as a partial short. In accordance further with the invention, the short may be permanently in place, being effected by discrete resistors, or being effected in the form of conductive flexible carbon material laid across the fuel cell stack underneath an external seal area. In accordance still further with the invention, the shunt may be provided by incorporating a small amount of conductive carbon black into the ionomer polymer mixture used to create the polymer exchange membrane, so that it becomes a poor electronic conductor that will carry a few milliamps per square centimeter of current, limiting the cathode potential and allowing the reactants to dissipate more quickly than would occur by diffusion. In further accord with the invention, the shorting of each individual cell of a fuel cell stack only during startup and shutdown of the fuel cell stack may be achieved, such as by means of rotated or thermally controlled spring actuated shorting mechanisms.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 9 is an end elevation section of a first form of the embodiment of FIG. 8.

FIG. 10 is an end elevation section of a second form of the embodiment of FIG. 8.

FIG. 11 is an end elevation section of a third form of the embodiment of FIG. 8.

FIG. 12 is a simplified, stylized end elevation view of a fuel cell stack with the fuel manifold omitted, incorporating a third embodiment of the invention.

FIG. 13 is a partial, partially broken away, side elevation view of a fuel cell stack of FIG. 12.

FIG. 14 is a schematic illustration of a variant of FIG. 4 utilizing unilateral conduction devices.

MODES(S) FOR CARRYING OUT THE INVENTION

Figure 1:
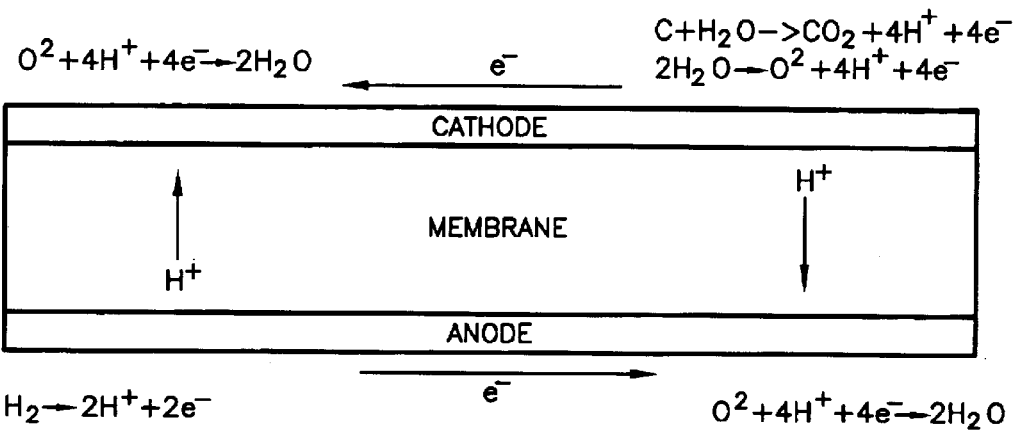
FIG. 1 is a sectional, stylized illustration of a fuel cell illustrating the problem of fuel starvation resulting in reverse currents and high voltage.

The phenomenon which is believed to occur in PEM fuel cells as a result of there being fuel in some areas of the anode flow field, but not all areas thereof, is illustrated in FIG. 1. As is known, hydrogen ions ($H^+$) migrate from the anode to the cathode as a result of the catalytic action on the anode, as is illustrated in the left side of FIG. 1. However, in areas of the fuel cell, represented at the right end of FIG. 1, where there is no hydrogen in the anode flow fields, the hydrogen ions migrate from the cathode, through the membrane, to the anode (sometimes called the reverse current). During this condition, the potential of the carbonaceous cathode support relative to the standard hydrogen electrode can exceed 1.4 volts, which is more than sufficient to cause corrosion of the cathode catalyst support as well as of the noble metals in the cathode catalysts. Even though the period of time during which this condition exists is very short each time that a fuel cell is started up or shut down, total destruction of the cathode can occur on the order of an accumulated time of between one and two hours. As a consequence, fuel cells can lose several tenths of a volt at medium current densities over a relatively small number of cycles.

The use of purge gases, such as air or nitrogen, to force the hydrogen out of the anode flow fields has only been moderately successful since it has been determined that the corrosion is not eliminated, but merely reduced. The use of an auxiliary circuit, with or without purge gases, to aid in controlling the cathode potential during startup and shutdown is ineffective because it aggravates the situation in any cells which have some fuel because a fuel-starved cell may be damaged by the current driven through it by neighboring cells which have adequate fuel and are generating current. An auxiliary circuit requires contactors and controllers that may be unreliable and result in a more complex and costly fuel cell stack assembly.

Figure 2:
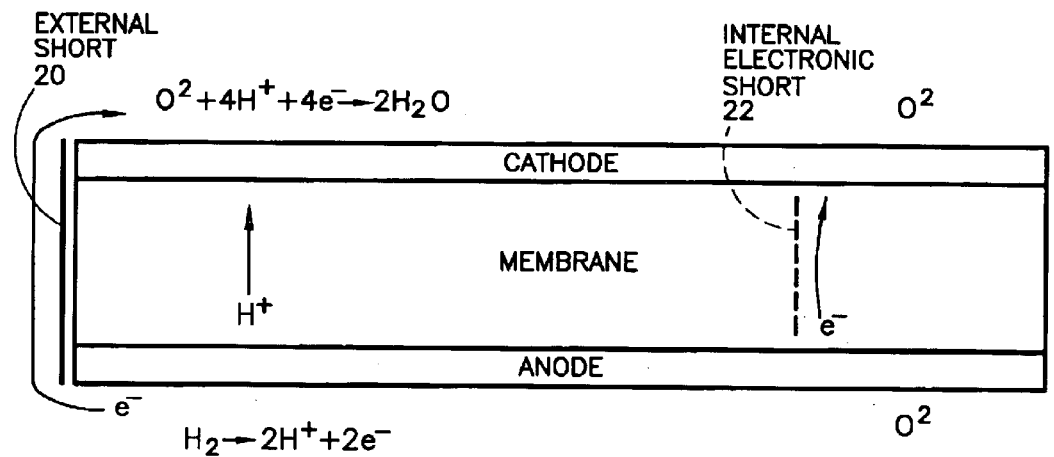
FIG. 2 is a sectional, stylized illustration of a fuel cell illustrating elimination of reverse currents by means of a short or shunt across the fuel cell.

According to the invention, a low resistance shunt, herein referred to as a "short", connects the cathode and the anode of each cell, thereby providing for electron flow. As seen in FIG. 2, the short may be provided by an external conductive member 20, or the short may be created by adding carbon to the PEM, or in other ways as described more fully hereinafter. Although this is illustrated in FIG. 2 as a finite conductive path 22, in fact, adding carbon to the PEM will provide a dispersed conductivity to the membrane.

Figure 3:
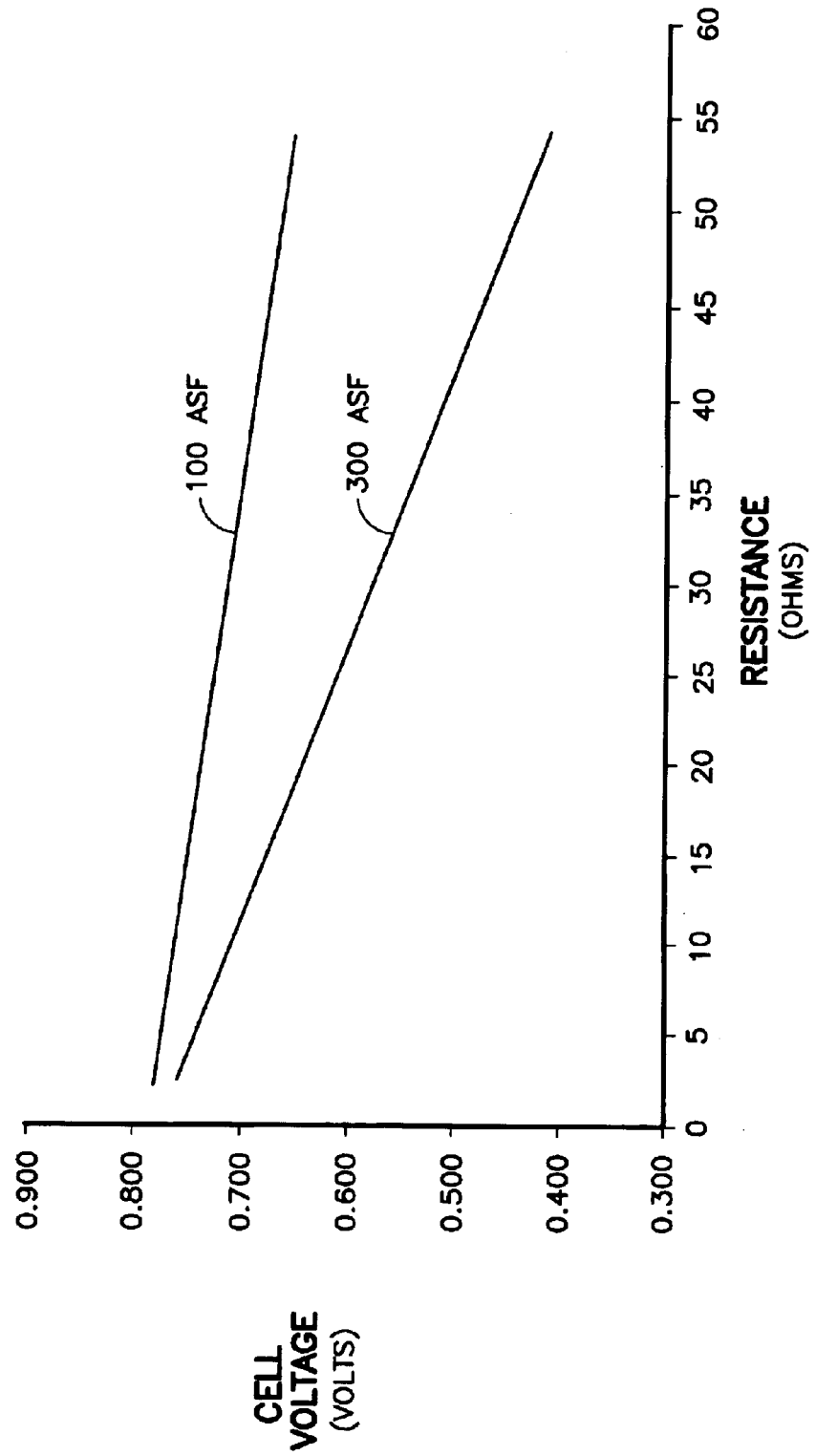
FIG. 3 is a simplified plot of individual cell performance following the decay that results from many startup/shutdown cycles, as a function of the internal resistance of each cell.

Frequently, one or more individual fuel cells in a fuel cell stack may exhibit partial internal shorting due to differences in construction; cells with significant shorts show low resistance. FIG. 3 illustrates the average performance of various cells of several fuel cell stacks, each of which had undergone 230–256 startup and shutdown cycles. The straight lines, representing cell voltage at 100 amps per square foot (ASF; 1.08 milliamps per square centimeter, mASC) and cell voltage at 300 ASF (323 mASC), are best fit straight lines, for about ten cells each, of cell voltage as a function of shunt resistance, internal to the fuel cell after the cells were subjected to 230–256 startup and shut down cycles. FIG. 3 illustrates that cells that are partially shorted (low resistance) have less decay following 230–256 startup and shutdown cycles, than cells which have a higher internal resistance. This data was obtained by measuring the voltage at 100 ASF (108 mASC) and the voltage at 300 ASF (325 mASC), as well as the internal, shunt resistance of individual cells. This data supports the precept of the present invention: providing a shunt across each cell of a fuel cell stack will reduce the degree of decay in performance as a consequence of startup and shutdown cycles.

Figure 4:
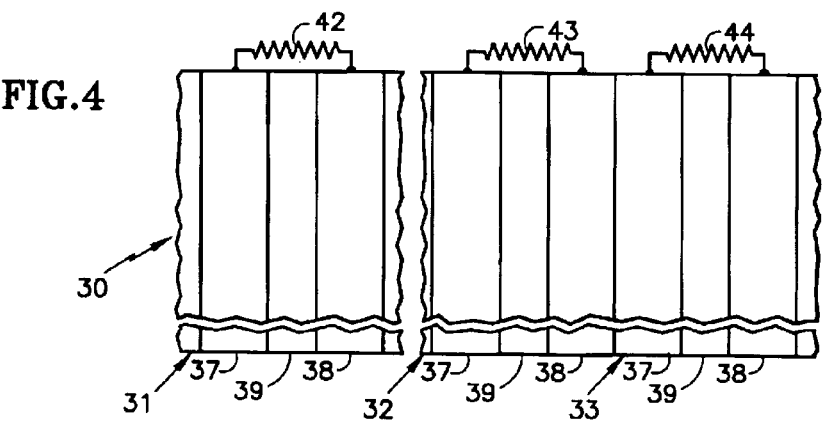
FIG. 4 is a schematic illustration of the invention.

FIG. 4 illustrates a fuel cell stack 30 of which only portions of three cells 31–33 are shown. Each cell has an anode 37, a cathode 38 and a membrane electrode assembly (MEA) 39 sandwiched therebetween. According to the invention, each cell will have an external resistor 42–44 connected between the anode 37 and the cathode 38 of the corresponding cell. Thus, each cell is guaranteed to have an electronic current path between its anode and its cathode, notwithstanding the internal ionic resistance of the cell itself. In the general case of the invention, the resistors 42–44 may be discrete resistors having a non-zero, low ohmic value, which may be on the order of 0.1 ohm–1.0 ohm. In the broadest sense of the invention, the resistors 42–44 may be permanently wired to the anodes and cathodes of each cell. Analysis of current flow in a stack shows that the parasitic power wastage in the resistors 42–44 is negligible when the fuel cell is producing full power, and therefore does not interfere with the overall capacity of the fuel cell (such as, for instance, the brake horsepower of an electric passenger vehicle powered by the fuel cell). As an example, consider a fuel cell stack having about 7½ inch square cells, with a 2 ohm resistor connected across each cell. At part power, for example, 20 ASF (21.5 mASC), each cell will be carrying about 8 amps and a typical voltage at that level should be about 0.85 volts. This means each cell is producing 6.8 watts of electrical power. The 2 ohm resistor will conduct 0.85 volts divided by 2 ohms, which is about 0.425 amps, equaling about 0.361 watts. The parasitic power is then 0.361/6.8, equaling 5.2% of the power produced. On the other hand, when each cell is producing around 500 ASF (539 mASC) or 200 amps, the voltage should be about 0.71 volts, resulting in 355 watts of power being produced by each cell. The same 2 ohm resistor will consume 0.71 volts divided by 2 ohms, equaling 0.355 amps, resulting in only 0.252 watts. Thus, at high current density, the parasitic power ratio will be 0.252/355, equaling 0.07% of the power produced by each cell. Thus, the invention may be practiced so as to substantially eliminate the decay that results from startup and shutdown, with small resistors permanently connected across each cell of a fuel cell stack.

Figure 6:
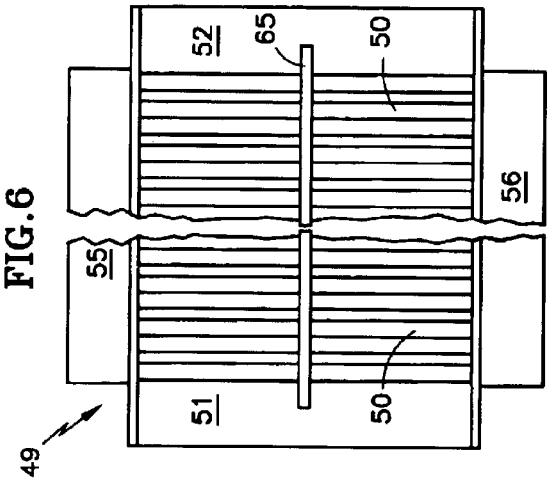
FIG. 6 is an end elevation view of the fuel cell stack of FIG. 5, with the fuel manifold omitted.
Figure 8:
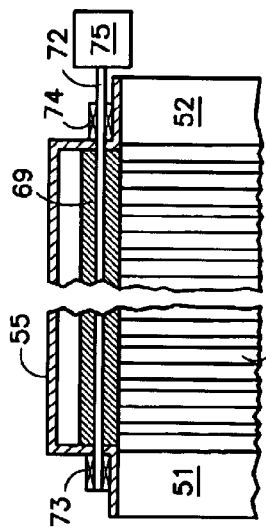
FIG. 8 is a simplified, partially sectioned end elevation view of the fuel cell stack of FIG. 7, with the fuel manifold omitted.
Figure 5:
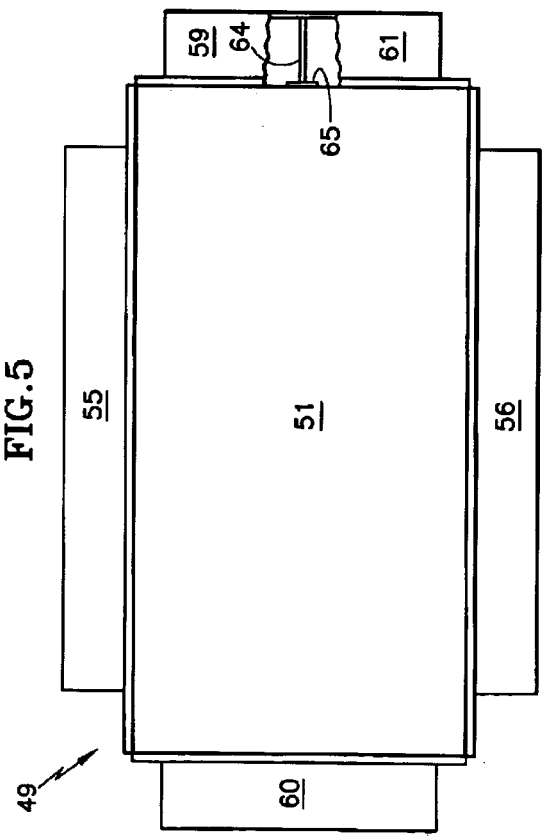
FIG. 5 is a simplified, partially broken away, side elevation view of a fuel cell stack incorporating one embodiment of the invention.
Figure 7:
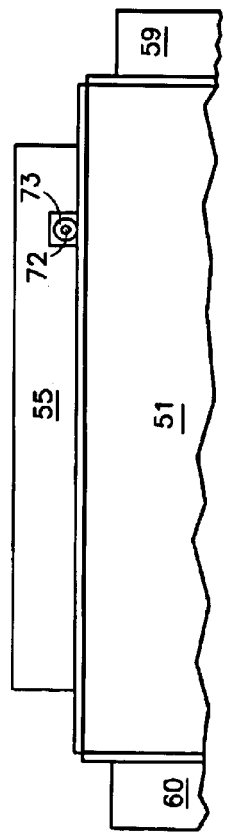
FIG. 7 is a partial, simplified side elevation view of a fuel cell stack incorporating a second embodiment of the invention.

One way to implement the permanent resistive shunts schematically illustrated in FIG. 4 is the use of a flexible conductive carbon material, extending across the entire stack, underneath an external seal, an example of which is illustrated in FIGS. 5 and 6. Therein, a fuel cell stack 49 includes a stack of fuel cells 50 compressed between end plates 51, 52, an air inlet manifold 55, an air exhaust manifold 56, a fuel inlet manifold 59, a fuel turnaround manifold 60 and a fuel exit manifold 61. A flexible, conductive carbon material, such as carbon cloth or carbon felt, is positioned between the cells 50 and the fuel manifold divider 64 so as to provide a shunt 65, having a resistance on the order of 0.8 ohms per cell. The numbers of layers of cloth or felt required to cause about 14.0 ASF (about 15 mASC) equivalent shunt current is determined through experimentation. Peak cell voltage during startup is effectively lowered from 0.8 volts (without the shunt) to 0.2 volts (with the shunt). With proper adjustment of the amount of carbon cloth or felt material used in the shunt, the shunt equivalent current may be reduced to on the order of 4.6 ASF (5 mASC), which will limit the cathode voltage to about 0.9 volts. With this nature of shunt, the fuel efficiency lost (parasitic power) is less than 1% for an average of 460 ASF (500 mASC) with the cell operating at about 0.7 volts. Further, this causes heat generation of less than 2 watts per cell which is easily dissipated through the structure of the stack. A shunt having higher resistance, and a lower effective shunt current, can be used in situations where the startup can proceed more slowly, by introducing the hydrogen into the anode flow fields in stages, where appropriate, or is otherwise less conducive to generation of reverse currents. The carbon cloth or felt shunt may be located beneath any of the manifold seals. The cloth or felt may be treated to create a gas seal as is known, if required. It is preferred to locate the shunt resistance adjacent to, or within, the fuel exit manifold 61. The fuel exit section of the cell experiences the largest reverse current and greatest corrosion and performance loss. Locating the shunt resistance adjacent to the fuel exit manifold increases its effectiveness by minimizing the effects of in-plane current flow.

If the shunt resistance is applied only during startup and shutdown, and removed during power generation, the shunt can be a dead short, that is, at substantially 0.0 ohms, and thus carrying any current which is generated. In FIGS. 7–11, one form of apparatus to provide a short across all of the cells during startup and shutdown, but remove the short during generation of useful power, includes a contact 69 disposed on a shaft 72 which is journaled in bearings 73, 74 and rotated by a suitable controller 75. In FIG. 9, the contact 69a may have a conductive portion 76 with an insulating layer 77 on a portion thereof. During startup and shutdown, the insulating layer 77 is positioned away from the cells (such as upward in FIGS. 7 and 8); during normal operation, the contact 69a is rotated so that the insulating layer 77 is in contact with the fuel cells 50, whereby the fuel cells do not have any external shunt during normal operation. In FIG. 10, a contact 69b is of a cam shape, having a lobe 79 that is positioned in contact with the fuel cells 50 during startup and shutdown, and is rotated so as to be out of contact with the fuel cells 50 during normal, power-generating operation. In FIG. 11, a contact 69c has a conductive portion 82 and a sector 83 of insulating material. The contact 69c will be positioned during startup and shutdown so that the conductive portion 82 is in contact with the fuel cells 50, and will be rotated during normal, power-producing operation so that the insulating sector 83 will be in contact with the fuel cells.

Another selective shunt is illustrated in FIGS. 12 and 13 therein, a shorting device 85 (positioned similarly to the shaft 72 in FIGS. 7 and 8) may comprise a strip of graphite or corrosion resistant metal. The shorting device is suspended from a reactant manifold such as the air inlet manifold (as an example, in the illustrated embodiment) by means of a pair (but it could be more) of compression springs 86, 87, the spring constants of which are substantially alike and do not vary by much as a function of temperature, as well as a pair of tension springs 90, 91 which are comprised of a shape memory alloy formulated to transition from having a spring constant which is less than that of the compression springs, below its martensitic start temperature, to having a spring constant which is greater than the spring constant of the compression springs, when its temperature is above the austenitic start temperature. Thus, at the lower temperature, the compression springs 86, 87 will exert a greater force between the manifold 55 and the shorting device 85 than do the tension springs 90, 91 so that the shorting device is forced against edges of the fuel cells, thereby shorting them out. When the temperature increases sufficiently, the force in the tension springs 90, 91 will exceed the force exerted by the compression springs 86, 87 and thereby raise the shorting device 85 away from the edges of the fuel cells in the stack 51. By proper formulation, the transfer from contacting the cell stack to noncontacting the cell stack can be around 50° C. (122° F.) or thereabouts. Of course, various configurations can be utilized to implement the spring embodiment of the invention just described. For instance, a greater or fewer number of springs may be utilized, and other accouterments to assist in operations may be provided, if found suitable in any implementation of the present invention. The shape memory alloy actuator springs 90, 91 may be formed from Alloy K available from Memory Corporation or any other supplier. In operation, the temperature of the fuel cell may be relied upon to cause the shorting device 85 to contact the cells of the stack 51 as the stack cools down. Although it is feasible that the stack temperature might be relied upon to warm the shape memory alloy actuator springs 90, 91 during startup of the fuel cell stack, it is probably more feasible to use the resistance of the shape memory alloy itself as a heater to warm the springs 90, 91 by applying electric current to the springs 90, 91, in an obvious fashion. There are many other ways in which the shunt may be selectively applied and removed from the fuel cells.

In accordance with another embodiment of the invention a permanent, dispersed shunt is provided within each fuel cell by incorporating a small amount of conductive carbon black into the ionomer polymer mixture used to create the polymer exchange membrane, so that it becomes a poor electronic conductor that will carry a few milliamps per square centimeter of current, limiting the cathode potential and allowing the reactants to dissipate more quickly than would occur by diffusion.

The arrangement of FIG. 4 can be improved upon as shown in FIG. 14 by substituting unilateral conducting devices, such as diodes 95 instead of resistors. This will permit electron flow from the anode to the cathode, as shown in FIG. 2, but will not shunt current, of the opposite direction, during power generation. The electron flow is small, and the voltage across each diode is fractional, so the necessary characteristics are easily achieved. The diodes (or other unilateral conductors) may be implemented as discrete external devices to provide through-plane shunts as shown.

In the general case, the unwanted currents are more severe at the downstream ends of the cells, so the shunts may be located near the fuel exit manifold to the extent that it is reasonable to do so.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell system comprising a stack of serially-connected fuel cells, each of said fuel cells having an anode, a corresponding cathode, a proton exchange membrane (PEM) disposed between the anode and the cathode, a carbonaceous cathode catalyst support, and metal catalysts associated with said PEM, each one of said fuel cells being provided with a shunt for conducting electrons from the anode of said one fuel cell to the cathode of said one fuel cell, thereby to reduce (1) cathode potentials relative to a standard hydrogen electrode, (2) corrosion of the cathode support and catalysts, and (3) decay of fuel cell performance as a result of startup and shutdown cycles, the conductance of the shunt provided to each cell being substantially the same as that provided to the other cells of the stack.

2. A system according to claim 1 wherein said shunts are connected between the anode and cathode of said fuel cells only during startup end shutdown.

3. A system according to claim 2 wherein:
said shunts comprise a conductor moved between a first position, in which it connects each of said anodes with the corresponding one of said cathodes, and a second position, in which it does not connect any of said anodes with any of said cathodes.

4. A system according to claim 1 wherein:
said shunts comprise a strip of graphite or corrosion resistance metal suspended from a reactant manifold by a plurality of compression springs having substantially the same spring constant, and by a plurality of tension springs comprised of a shape memory alloy each having, at a first temperature, a spring constant greater than said same spring constant, and having, at a second temperature, below said first temperature, a spring constant which is less than said spring constant.

5. A system according to claim 4 wherein:
said tension springs are heated with electric power.

6. A system according to claim 1 wherein said shunts conduct electrons between the corresponding anode and cathode during all periods of operation of said fuel cell system, including periods of normal operation of said fuel cell system.

7. A system according to claim 6 wherein said shunts are discrete resistors permanently connected between corresponding anodes and cathodes.

8. A system according to claim 6 wherein said fuel cell system includes external fluid manifolds and said shunts comprise a conductor laid between one of said manifolds and all of said fuel cells.

9. A system according to claim 8 wherein said conductor is a flexible, conductive carbon material.

10. A system according to claim 6 wherein each PEM comprises a mixture of an ionomer polymer and conductive carbon black, and said shunts comprises the carbon black of each PEM.

11. A system according to claim 1 wherein:
said shunts comprise unilateral conductive devices poled to conduct electrons from the anode to the cathode.

* * * * *